United States Patent [19]

Jorgensen et al.

[11] Patent Number: 4,673,229
[45] Date of Patent: Jun. 16, 1987

[54] ELECTRICAL DISTRIBUTION SYSTEM WITH AN IMPROVED HOUSING

[75] Inventors: George N. Jorgensen, Oxford; Gilbert A. McGoldrick, Hamilton, both of Ohio; Allan E. Slicer, Brookville, Ind.

[73] Assignee: Square D Company, Palatine, Ill.

[21] Appl. No.: 650,377

[22] Filed: Sep. 13, 1984

[51] Int. Cl.⁴ .......................................... H01R 13/60
[52] U.S. Cl. ................................. 439/207; 174/68 B; 439/110; 439/94; 439/212
[58] Field of Search ................ 339/22 R, 22 B, 21 R, 339/20, 23, 24, 14 R; 174/99 B, 68 B

[56] References Cited

U.S. PATENT DOCUMENTS

| Re. 26,310 | 11/1967 | Moodie et al. | 174/68 B |
|---|---|---|---|
| 3,178,668 | 4/1965 | Weimer et al. | 339/22 B |
| 3,187,086 | 6/1965 | Moodie et al. | 74/68 B |
| 3,384,855 | 5/1968 | Jorgensen et al. | 339/22 B |
| 3,489,981 | 1/1970 | Corl et al. | 339/21 R |
| 3,555,293 | 1/1971 | Shannon | 174/68 B |
| 3,566,331 | 2/1971 | Stanback et al. | 339/22 R |
| 3,636,237 | 1/1972 | Hafer | 174/68 B |
| 3,909,098 | 9/1975 | Reed et al. | 339/22 B |
| 4,213,003 | 7/1980 | Carlson | 174/68 B |

Primary Examiner—Gil Weidenfeld
Assistant Examiner—Thomas M. Kline
Attorney, Agent, or Firm—Larry I. Golden; Richard T. Guttman

[57] ABSTRACT

An improved housing for a busway system is provided by a two-piece ground bus which includes a generally U-shaped upper section having a top portion and a pair of parallel side flanges extending a predetermined distance and a generally U-shaped lower section having a bottom portion and a pair of parallel side flanges extending intermediate and parallel to the side flanges of the upper section. The main bus bars are retained intermediate the top portion and the bottom portion of the ground bus while also being positioned between the side flanges of the upper section of the ground bus. A side rail is provided on each side of the ground bus. A plurality of fasteners extend along the length of the busway section and connect each side rail with both the upper and lower sections of the ground bus. Ears formed out of the side rail members immediately adjacent the top portion of the ground bus provide additional reinforcement of the housing for resisting magnetic forces created by high fault currents running through the bus bars.

11 Claims, 11 Drawing Figures

ELECTRICAL DISTRIBUTION SYSTEM WITH AN IMPROVED HOUSING

BACKGROUND OF THE INVENTION

1. Field of the Invention

This invention relates to an electrical distribution system, and more particularly to an improved housing for a busway system having sections of both feeder busway and plug-in busway.

2. Description of the Prior Art

The present invention represents an improvement over the electrical distribution systems disclosed in U.S. Pat. No. 3,566,331, issued Feb. 23, 1971 as well as U.S. Pat. No. 3,384,855, issued May 21, 1968, to which reference may be had for description of common features and applications. Other features and applications of the distribution system may be further understood by reference to U.S. Pat. No. 3,187,086, issued June 1, 1965, reissued as U.S. Pat. No. 26,310, on Nov. 28, 1967 as well as U.S. Pat. No. 3,909,098, issued Sept. 30, 1975. Each of the afore-referenced patents is assigned to the same assignee as the instant invention and is hereby incorporated by reference.

SUMMARY OF THE INVENTION

It has been found desirable to envelope or surround the main phase bus bars of the system with a ground bus. A generally U-shaped upper section of the ground bus receives a generally U-shaped lower section of the ground bus with the main phase bus bars captured between the two sections of ground bus. The ground bus, together with a pair of side rails form a housing for the main phase bus bars. Multiple fasteners extend along the length of the busway section on each side, connecting the side rail to both the upper and lower sections of the ground bus and thereby securing the main phase bus bars within the envelope formed by the ground bus sections and also decreasing the electrical ground resistance. This particular housing construction also facilitates heat dissipation.

Additional reinforcement is built into the housing to resist magnetic forces created by high fault currents. This is accomplished by forming ears out of the side rail members of the housing in addition to the multiple fastening of the rail members to the ground bus. Further stability may be provided, particularly in higher amperage busway, by use of generally U-shaped surge clamps or brackets which can be readily connected between the side rails at any of a number of selected locations.

Specially formed bus bars are utilized in this system which are insulated to permit tap-off at designated tap-off areas. The insulated bus bars are sandwiched in back-to-back engagement with each other along sections where no connections will be made while they are spaced apart where tap-off or other connections may be made.

It is an object of the present invention to provide an improved electrical distribution system of economic construction.

It is a further object of this invention to provide an integral ground bus which envelopes the main phase bus bars.

Another object of this invention is to provide an improved housing for the bus bars which is capable of withstanding high fault currents.

Further objects and features of the invention will be readily apparent to those skilled in the art from the following specification including the appended claims and the accompanying drawings of the invention in which:

DESCRIPTION OF THE PREFERRED EMBODIMENT

Figure 1:
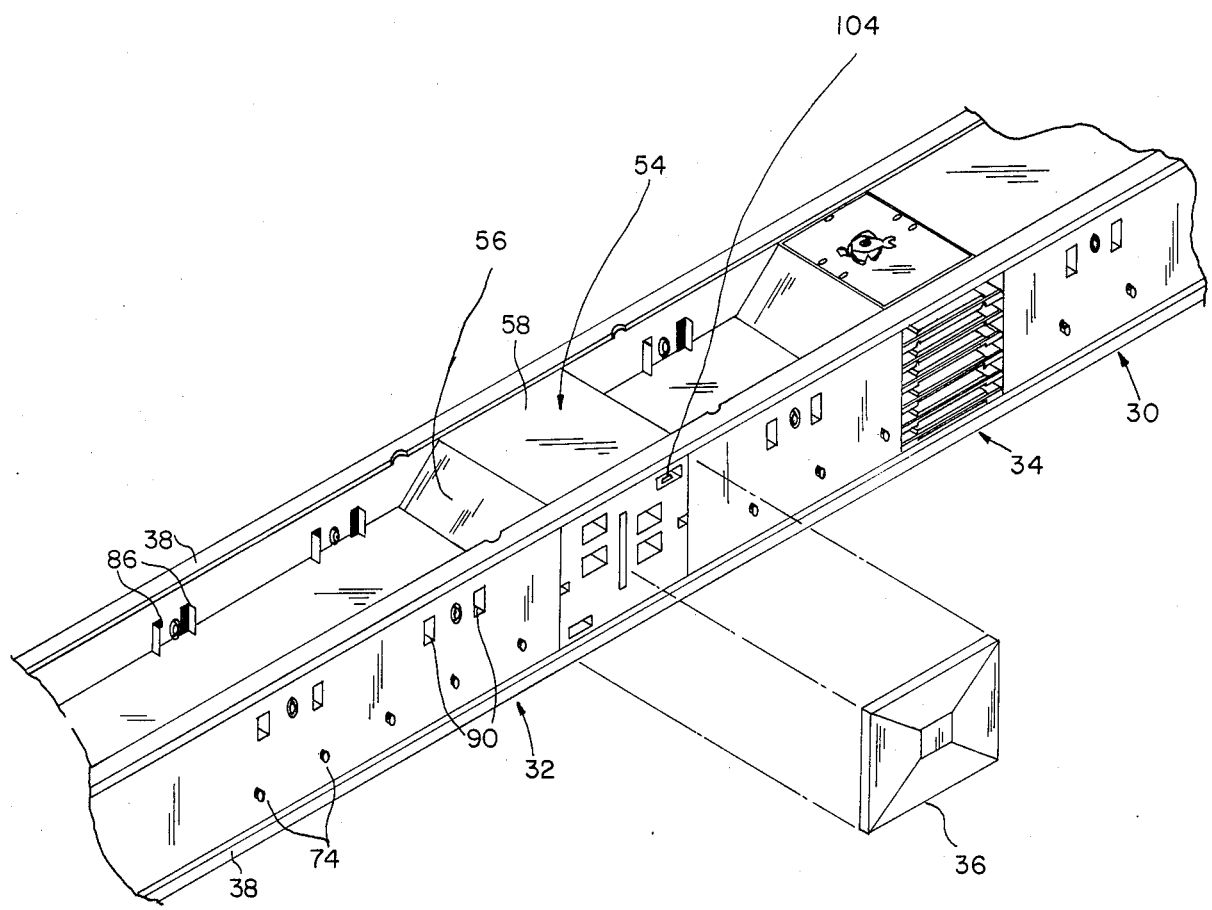
FIG. 1 is a perspective view showing connected feeder and plug-in sections of busway in accordance with the present invention.

The electrical distribution system of the present invention is described with respect to both feeder sections of bus bars generally identified as 30 in FIG. 1 of the Drawings and plug-in sections of bus bars identified generally by reference character 32. The present design is intended for busway systems carrying from 800A through 5000A, although it is not necessarily restricted to such applications. The current carrying capacity of the busway is dependent upon the size and material of the individual bus bars as well as the number of runs of bus bars within a busway section. The U.S. Pat. No. 3,384,855 discloses both single and double runs of bus bars. The plug-in sections 32 are provided with plug-in openings 34 at various locations along its length as discussed, for example, in the previously referred to U.S. Pat. No. 3,566,331. The plug-in openings facilitate the tap-off of current from those locations and are covered by a swingable door 36 when the opening is not being used. The bus bars are carried between a pair of ground side rails 38 which will later be further described.

The main phase bus bars 40 of the instant invention are appropriately insulated by various members of insulating material 41 as shown, for example in U.S. application, Ser. No. 650,376 by Allan Slicer filed concurrently herewith, the disclosure of which is hereby incorporated by reference. The bus bars 40 are carried in stacked relationship except where physical separation of the bars is required to facilitate a splice connection between sections of busway or at the tap off locations of the plug-in busway. At those locations where connections may be made, the bus bars 40 are offset to provide sufficient clearance between bars for connections. The main phase bus bars 40 are enveloped by a ground bus 42 which includes an upper section 44 and a lower section 46. The upper section 44 includes a top portion 44a with opposite side flanges 44b extending toward the lower section. The lower section 46 includes a bottom portion 46a with similarly extending side flanges 46b, although the lower side flanges 46b are substantially shorter than the upper side flanges 44b. The lower section 46 is positioned between the flanges 44b of the upper section, such that the two pairs of flanges are substantially aligned at the bottom edge thereof, with the main phase bus bars 40 sandwiched between the top portion of the upper section 44 and the bottom portion of the lower section 46 while also being located between the side flanges 46b of the upper section.

The ground bus 42 may be formed of a suitable material such as copper or an aluminum alloy and, if desired, painted on its exterior surfaces facing away from the enveloped main phase bus bars 40.

Figure 2:
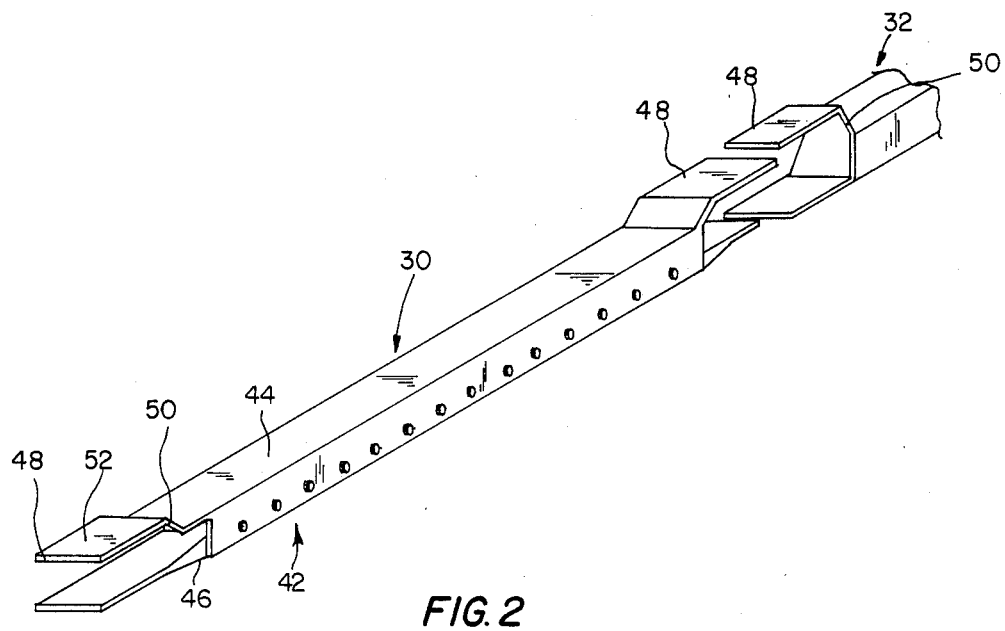
FIG. 2 is a perspective view showing a feeder section of ground bus in accordance with the instant invention.
Figure 3:
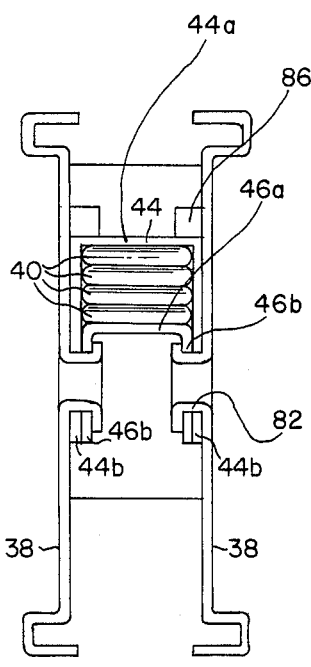
FIG. 3 is a cross sectional view showing the housing enclosing the main phase bus bars in accordance with the present invention.
Figure 4:
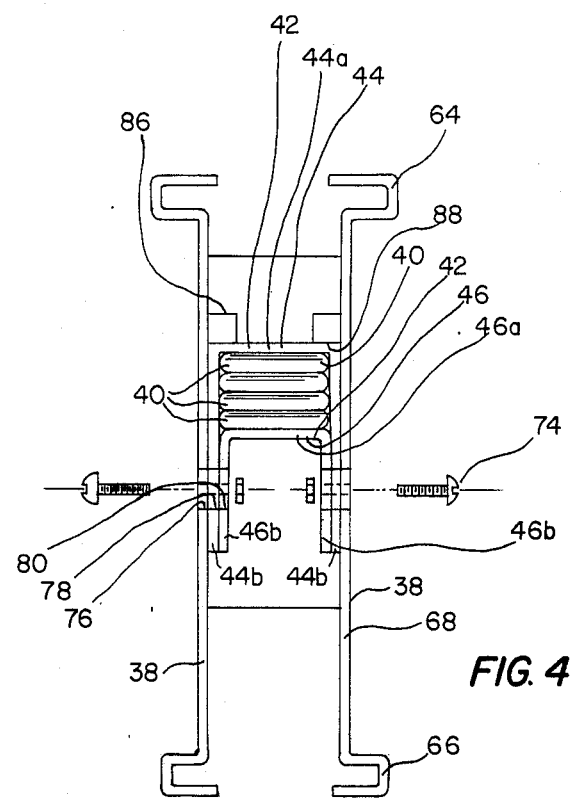
FIG. 4 is a cross sectional view as shown in FIG. 3 incorporating an alternate method of fastening.
Figure 5:
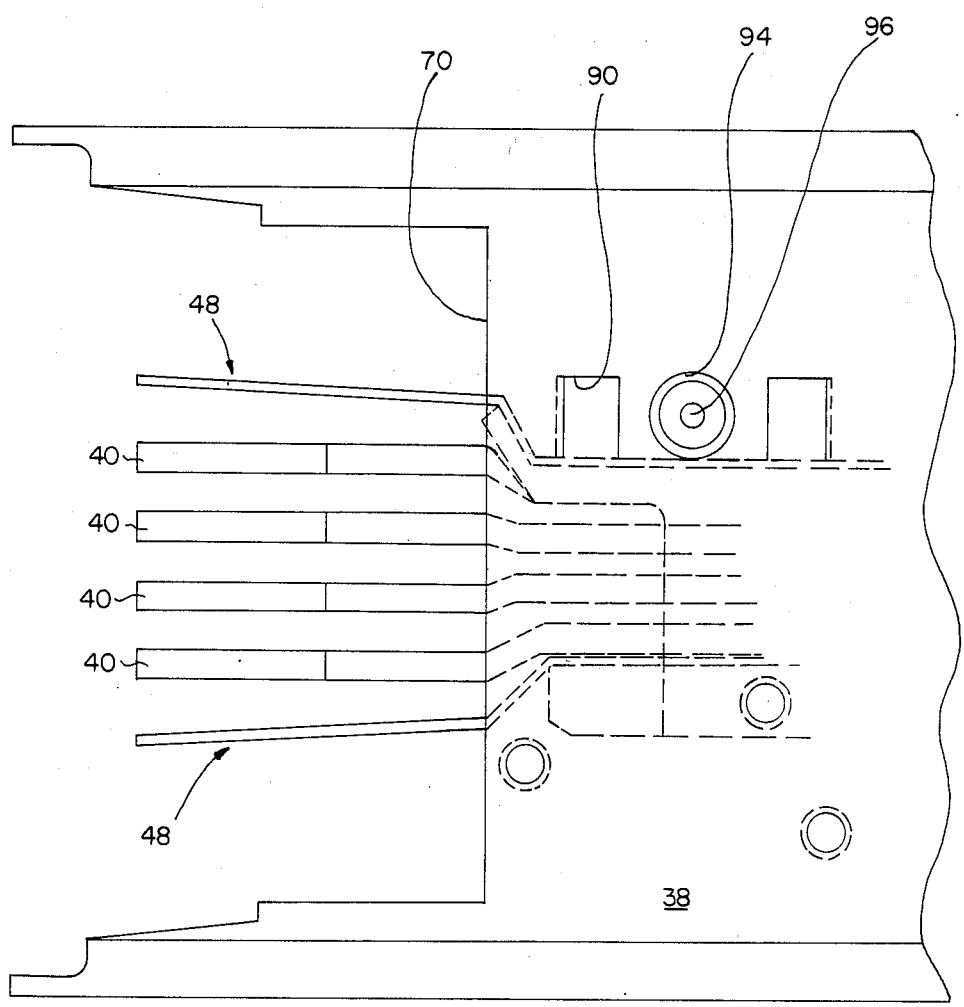
FIG. 5 is a partial side view showing an end of a section of busway in accordance with the present invention.
Figure 6:
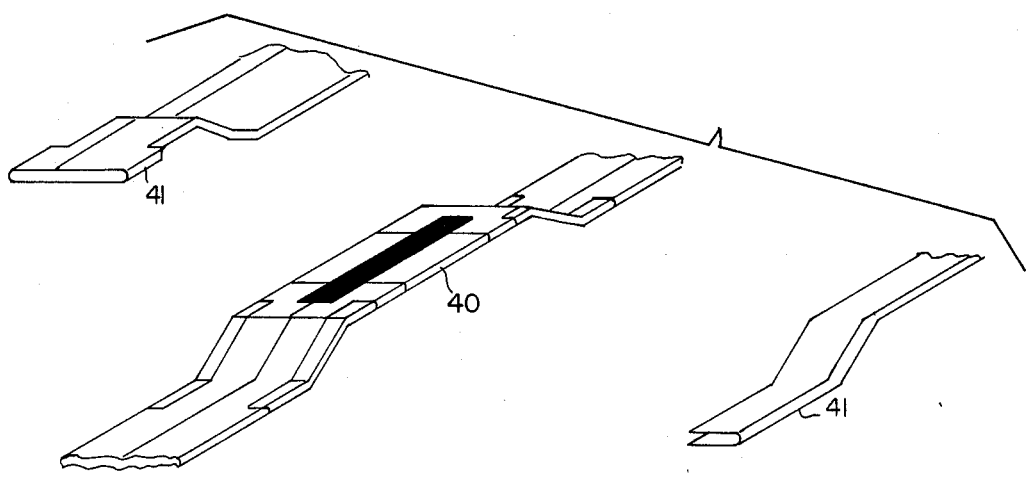
FIG. 6 is a perspective view showing an insulated bus bar in accordance with the present invention.
Figure 7:
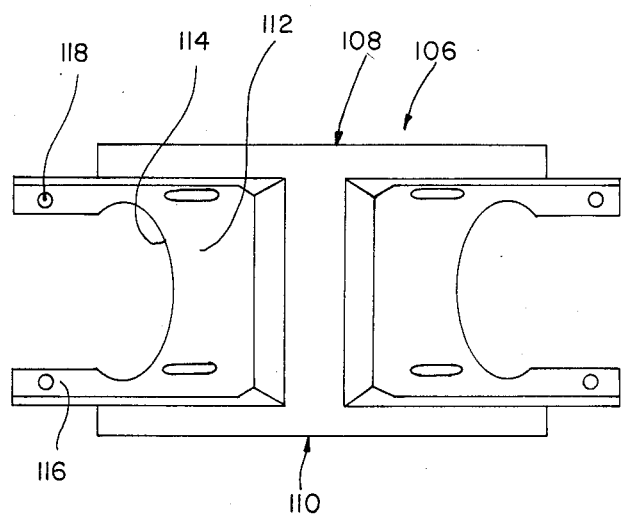
FIG. 7 is a side view of a tie channel used to tie adjoining sections of the busway as shown in FIG. 1 together.
Figure 8:
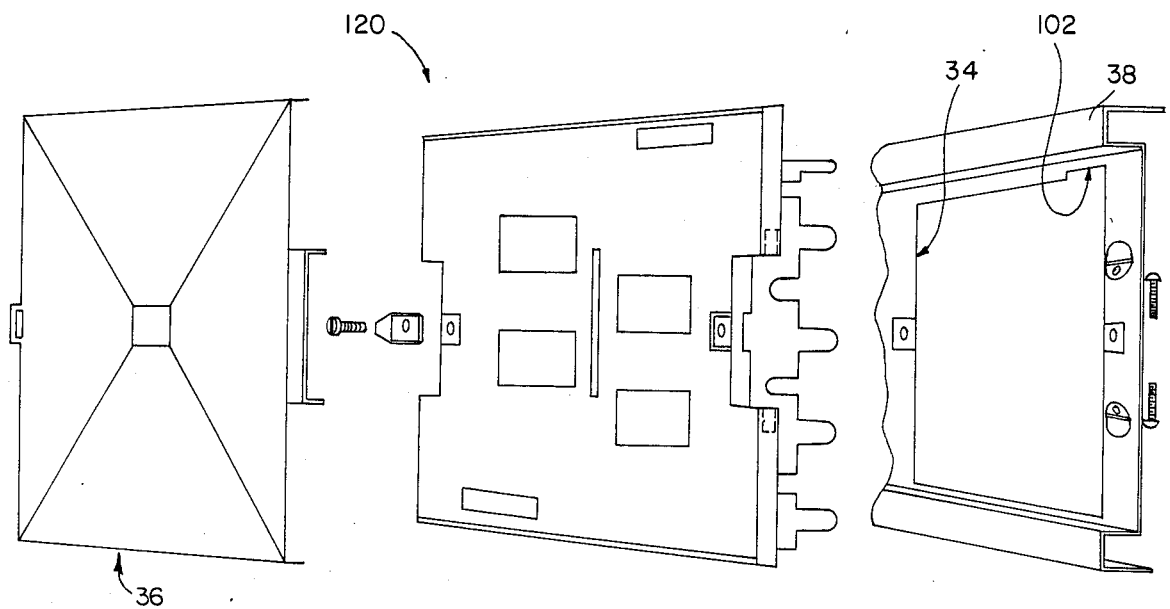
FIG. 8 is an exploded perspective view showing a plug-in base assembly and side rail of the present invention.
Figure 9:
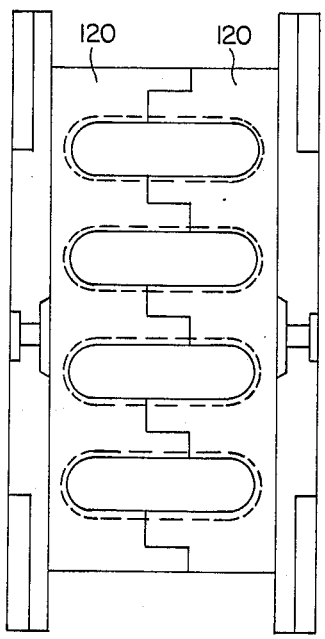
FIG. 9 is an end view of the base shown in FIG. 8 in back to back association with another base.
Figure 10:
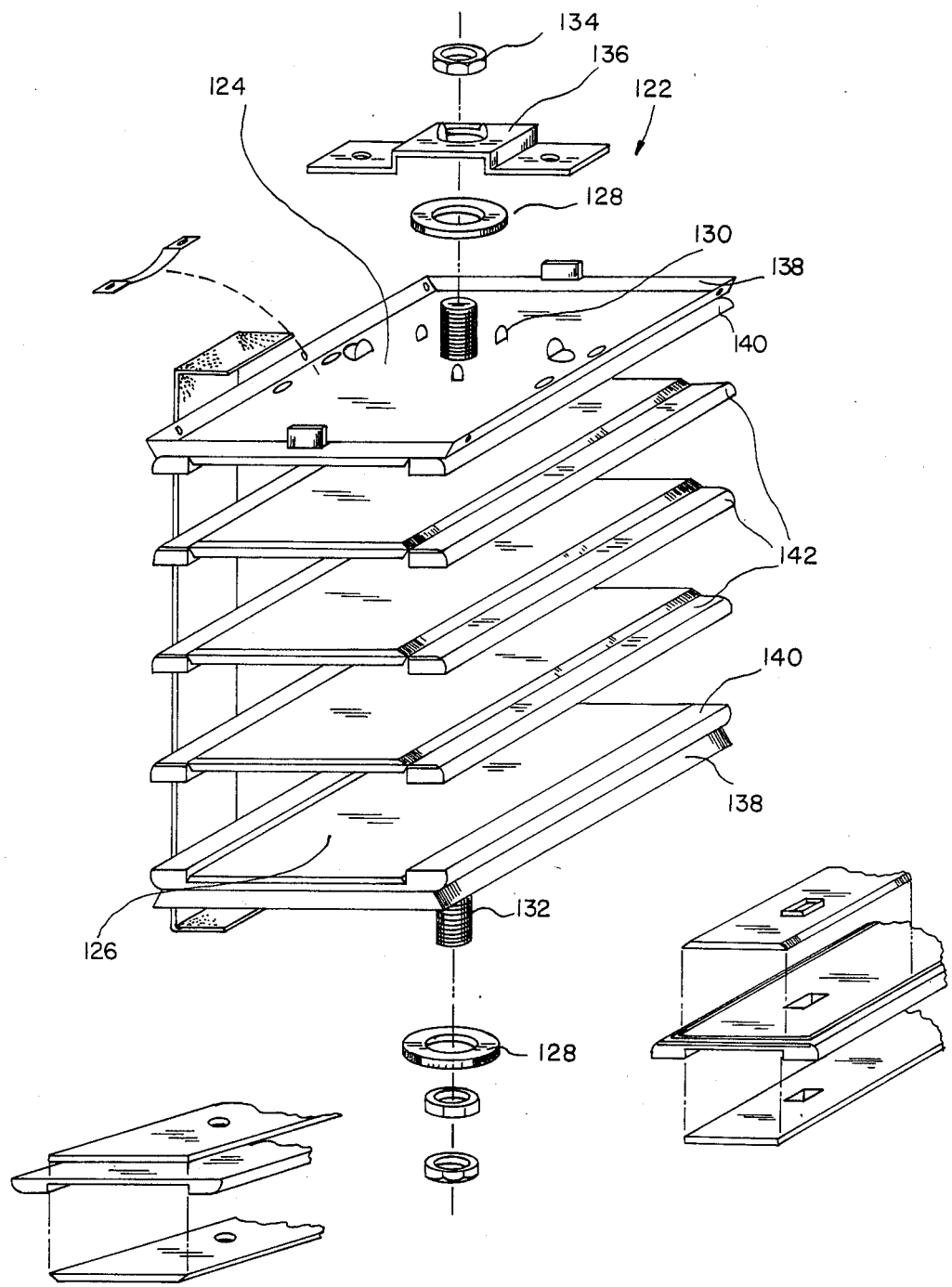
FIG. 10 is an exploded view of a joint in accordance with the present invention.

On both the plug-in sections 32 and feeder sections 30, the ground bus 42 includes a flared end portion 48 to accommodate the separation between bus bars required for splice connection between sections. The flared end portion 48 as shown in FIGS. 2 and 5 includes an inclined section 50 and an extending connecting portion 52 on both the upper sections 44 and lower sections 46 of the ground bus 42. The flared formation facilitates drainage of water which may fall on the joint area. The plug-in sections 32 of busway include humped portions 54 on both the upper and lower sections, 44 and 46, respectively, of ground bus 42 corresponding to the plug-in opening locations 34 along the length of the busway. Each humped portion 54 includes opposite inclined top portions 56 and a bridging top portion 58 integrally connecting the two inclined top portions as well as opposite inclined bottom portions and a bridging bottom portion integrally connecting the two inclined bottom portions. Plug-in openings are also provided in the ground bus at the plug-in locations.

The ground bus 42, together with a pair of electrically grounded opposite side rails 38 form a housing for the main phase bus bars. The opposing side rails each include a top channel 64, a bottom channel 66 and an inwardly recessed main side portion 68 intermediate the top and bottom channels. The rails are positioned such that the top and bottom channels 64 and 66, respectively, are inwardly directed. At the end of each busway section, a cutout 70 is provided in the main side portion of each rail as shown in FIG. 5 where the bus bars are offset to facilitate connection between sections and removal of a connecting joint which is more fully described in U.S. application Ser. No. 650,379 now abandoned by Allan Slicer and Robert Witney filed concurrently herewith, the disclosure of which is hereby incorporated by reference.

At various locations along the length of the housing the side rails 38 are fastened to the upper and lower ground bus sections, 44 and 46, along the overlapping marginal side flanges 44b and 46b of the ground bus. This connection can be made by extending a plurality of standard fasteners through aligned openings 76, 78 and 80 in the side rails, upper section side flange and lower section side flange, respectively. It has also been found that this connection can be made by extruding holes at appropriate positions in each rail, forcing the cylindrical extrusion 82 through the overlapping side flanges of the ground bus and crimping the extruded portion against the inside of the lower section of the ground bus. Although it has not been found to be necessary, additional fasteners such as nuts and bolts could also be used at selected openings provided by the crimped connection.

A plurality of ears 86 are bent inward from the main side portion of each rail such that the bottom edge 88 of each ear engages the top portion of the upper ground bus 44a and provides additional support and short circuit strength. The ears 86 are spaced apart on each rail as believed desirable and provide registered openings 90 on the opposing rail members. The openings 90 provide for drainage of water which would otherwise collect at the lower sections of the housing between the flared end portions 48 at the joints and the humped portions 54 at the plug-in locations. The ears 86 are provided in pairs with the notched openings of each pair of ears in facing relationship, i.e., the opening extends from its associated ear toward its paired ear. A circular embossment 94 is formed between each pair of ears with a hole 96 at the center of the embossment 94. This facilitates connection of a generally U-shaped surge clamp 98 which has opposite mounting tabs 100 through which a fastener may connect the clamp 98 to the opposite rails. This provides an additional measure of protection for high fault currents.

As referred to previously, the plug-in sections 32 of busway are provided with plug-in openings 34 in the main side portions 68 of the side rails 38 at selected locations at which points the bus bars are spaced apart to facilitate tap-off connections. The plug-in openings 34 of the opposite side rails 38 are provided at the same location along the length of the bus bars contained therein, i.e., the openings on one side rail 38 are in registration with the openings on the opposite rail member. The opening is generally rectangular in shape and includes an offset notch 102 at the upper right corner to facilitate ground connections.

A ground clip 104 is fastened to the top portion of the ground bus by a fastener. Additional holes may be provided above the plug-in opening on the main side portion between the opening and the top channel to facilitate the riveted connection of the side rails to the upper section of the ground bus, if believed desirable.

A joint tie channel 106 is provided to help secure adjoining sections of busway together. The tie channel 106 is substantially U-shaped with a top flange 108 and a bottom flange 110 which overlie the respective top channels 64 and bottom channels 66 of the side rails 38 of adjoining sections of busway. A recessed securing portion 112 is provided at each end of the symmetrical tie channel which forms top and bottom segments of receiving channels at each end of the tie channel that receives respective portions of the channels provided on the side rails.

A generally mushroom-shaped cutout 114 is provided on each securing portion forming securing legs 116 which extend outward on each end of the tie channel 106.

Additional holes 118 are formed in the securing portion which facilitate connection of the tie channel to the side rails of the adjoining sections of busway.

Each plug-in openings 34 is associated with a swingable door 36 and a plug-in base 120 which are more fully disclosed in U.S. application Ser. No. 650,378 by Allan Slicer filed concurrently herewith, the disclosure of which is hereby incorporated by reference. The connecting joint 122, which is somewhat similar to the type shown in U.S. Pat. No. 3,384,854, is provided to facilitate the connection between sections of busway and can be used to connect a feeder section 30 to another feeder section 30 or to a plug-in section 32. The connecting joint 122 includes a top cover plate 124 and a bottom cover plate 126 which each captivates a Belleville washer 128 under a number of ears 130. A two headed bolt 132 extends through and connects the two cover plates 124 and 126 with a hex nut 134 at the top end which is retained by a nut retaining bracket 136. Each cover plate has an upwardly inclined periphery 138 to provide lead in for adjoining busway sections. A pair of identical outer insulators 140 or phase barriers and two or three identical inner insulators 142 or phase barriers are provided between the cover plates 124 and 126.

A ground splice plate is engaged with the outer surface of each outer barrier which, upon tightening the bolt provides a ground connection between separate sections of busway as the ground splice plate engages the inner surface of the respective flared ends of ground bus for adjoining sections of busway.

Figure 11:
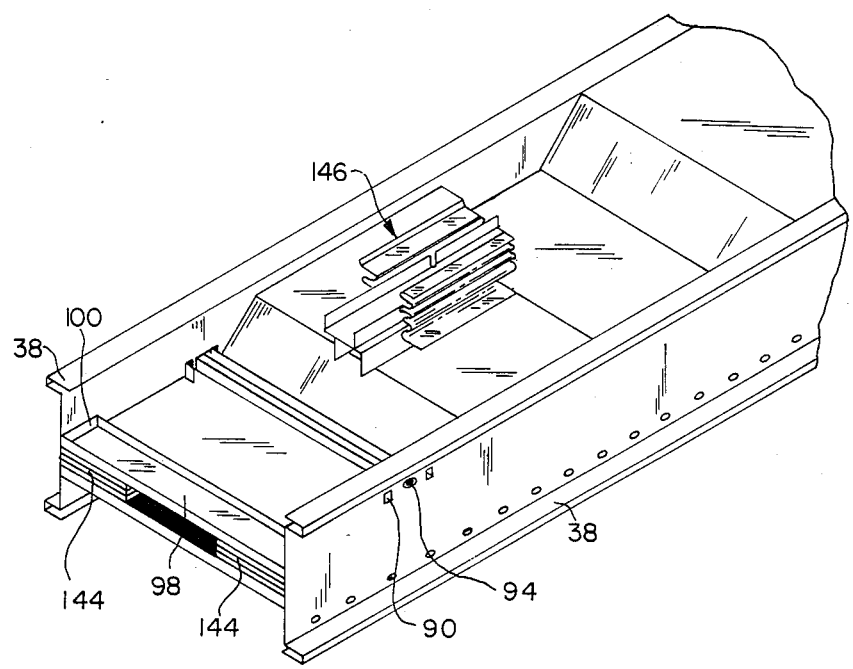
FIG. 11 is a partial perspective view showing a double sandwich section of plug-in busway in accordance with the present invention.

FIG. 11 shows a partial section of plug-in busway which carries two parallel sandwiches 144 of bus bars. Bracing between the bus bars is illustrated by showing the brace assembly 146 on top of a section of busway. The same side rails 38 are used regardless of the width of the busway section while the ground bus 42 is, of course, formed to an appropriate width to accommodate the size of the bus bars and the number of sandwiches carried by the particular busway section.

While the invention has particularly been shown and described with reference to a preferred embodiment, it will be understood by those skilled in the art that variations in form, construction and arrangements may be made therein without departing from the spirit and scope of the invention, all such variations are intended to be covered in the appended claims.

What we claim is:

1. A busway section comprising:
    a pair of longitudinally extending electrically grounded side rails;
    a plurality of longitudinally extending main phase bus bars intermediate said grounded side rails;
    a ground bus for supporting said main phase bus bars between said ground side rails, said grounded bus having a generally U-shaped upper section, the upper section including a top portion with a first pair of generally parallel depending side flanges, and a lower section including a bottom portion with a second pair of generally parallel depending side flanges, said lower section located between said first pair of side flanges, each of said first pair side flanges including a portion located intermediate and in engagement with a respective one of said second pair side flanges and a respective grounded side rail, said main phase bus bars positioned intermediate said top portion and said bottom portion and intermediate said first pair of side flanges: insulating means for insulating each of said main phase bus bars; and
    connecting means for mechanically and electrically connecting each said grounded side rail to said ground bus.
2. A busway section as claimed in claim 1 wherein said upper and lower sections each include flared end portions without a depending side flange to accommodate spaced apart bus bars at such locations for splice connections between sections of busway.
3. A busway section as claimed in claim 2 wherein said upper and lower sections each include a humped portion intermediate said flared end portions to accommodate spaced apart bus bars at such locations for tap-off connection at such locations, said upper section including portions defining a plug-in opening on each of said first side flanges, said openings aligned in registration with each other to provide for tap-off connection from either side of the busway section at a particular location, said side rails also being provided with respective plug-in openings aligned with said openings on said side flanges.
4. A busway section as claimed in claim 1 wherein each of said side rails includes a plurality of ears extending toward the opposite side rail and engaging the top portion of said upper ground bus.
5. A busway section as claimed in claim 3 wherein each of said side rails includes a plurality of ears extending toward the opposite side rail and engaging the top portion of said upper ground bus.
6. A busway section as claimed in claim 5 wherein said ears are each formed from a bent portion of said side rail providing an opening in said rail adjacent said top portion.
7. A busway section as claimed in claim 5 including a plurality of clamps extending between and connected to each of said side rails adjacent said top portion and a plurality of clamps extending between and connected to each of said side rails adjacent said bottom portion.
8. A busway section including:
    a housing;
    a plurality of parallel bus bars carried in generally stacked relationship within said housing;
    insulating means for insulating each of said bus bars;
    said housing comprising:
    a pair of generally parallel electrically grounded side rails;
    a generally U-shaped upper section ground bus having a top portion and a first pair of generally parallel depending side flanges, each first side flange engaged with a respective side rail, a generally U-shaped lower section ground bus positioned between said first pair of side flanges and having a bottom portion and a second pair of generally parallel depending side flanges in overlapping relationship with said first pair of side flanges, said bus bars carried between said side rails intermediate said top portion and said bottom portion and between said first pair of side flanges; and a plurality of fasteners each mechanically and electrically connecting a respective side rail with said upper section ground bus and said lower section ground bus.
9. A busway section as claimed in claim 8 wherein each of said side rails includes a plurality of ears extending toward the opposite side rail and engaging the top portion of said upper ground bus.
10. A busway section as claimed in claim 9 wherein said ears are each formed from a bent portion of said side rail providing an opening in said rail adjacent said top portion.
11. A busway section as claimed in claim 10 including a plurality of clamps extending between and connected to each of said side rails adjacent said top portion and a plurality of clamps extending between and connected to each of said side rails adjacent said bottom portion.

* * * * *